DOUBLE TRIGGER COMPOSED OF BINARY LOGIC ELEMENTS

Filed Dec. 9, 1959 4 Sheets-Sheet 1

INVENTOR
GERALD A. MALEY

BY Geoffrey Knight
ATTORNEY

FIG. 3

"X" INDICATES THE "ON" CONDITION

| LINE ↓ | | STATE → | 1 | 2 | 3 | 4 | 5 | 6 | 7 | 8 | 9 | 10 | 11 |
|---|---|---|---|---|---|---|---|---|---|---|---|---|---|
| I | X | 1 | | X | | X | X | X | | X | | X | |
| | X̄ | 2 | X | | X | | | | X | | X | | X |
| IN | Y | 1 | | | X | X | X | X | | | X | X | |
| IN | | 2 | | X | | X | X | X | | X | | X | |
| OUT | | 3 | | | | X | X | X | | | | X | |
| IN | Z | 1 | X | X | | | | | X | X | | | X |
| IN | | 2 | | X | | X | X | X | | X | | X | |
| OUT | | 3 | | X | | | | | | X | | | |
| IN | D | 1 | X | | X | | | | X | | X | | X |
| IN | | 2 | | X | X | X | | | | X | X | | |
| OUT | | 3 | | | X | | | | | | X | | |
| IN | E | 1 | | | | X | X | X | | | | X | |
| IN | | 2 | | | X | | | | | | X | | |
| NO | | 3 | X | X | | | | | X | X | | | X |
| YES | | 4 | | | X | X | X | X | | | X | X | |
| IN | F | 1 | | X | | | | | | X | | | |
| IN | | 2 | | | X | | | | | | X | | |
| NO | | 3 | X | | | | X | X | X | | | X | X |
| YES | | 4 | | X | X | X | | | | X | X | | |
| IN | G | 1 | X | X | X | X | | | | | | X | X |
| IN | | 2 | | X | | X | X | X | | X | | X | |
| IN | | 3 | | | X | X | X | X | | | X | X | |
| IN | | 4 | | X | X | X | | | | X | X | | |
| OUT | | 5 | | | | X | X | | | | | | |
| IN | H | 1 | X | X | | | | | X | X | | | X |
| IN | | 2 | | | | | X | X | X | X | X | | |
| OUT | | 3 | | | | | | | X | X | | | |
| IN | J | 1 | X | | | | X | X | X | | | X | X |
| IN | | 2 | | | | | X | X | X | X | X | | |
| OUT | | 3 | | | | | | X | X | | | | |
| IN | K | 1 | X | | X | | | | X | | X | | X |
| IN | | 2 | | | | | X | X | X | X | X | | |
| OUT | | 3 | | | | | | | X | | X | | |
| IN | L | 1 | | | | X | X | | | | | | |
| IN | | 2 | | | | | | | X | X | | | |
| IN | | 3 | | | | | | X | X | | | | |
| IN | | 4 | | | | | | | X | | X | | |
| NO | | 5 | X | X | X | X | | | | | | X | X |
| YES | | 6 | | | | | X | X | X | X | X | | |
| O | | 1 | | X | X | X | | | | X | X | | |
| | | 2 | | | | | X | X | X | X | X | | |

DOUBLE TRIGGER COMPOSED OF BINARY LOGIC ELEMENTS

Filed Dec. 9, 1959 4 Sheets-Sheet 3

$B = x\bar{b}ca + b\bar{c} + b\bar{a} + b\bar{x}$

DOUBLE TRIGGER COMPOSED OF BINARY LOGIC ELEMENTS

Filed Dec. 9, 1959 4 Sheets-Sheet 4

FIG. 7

"X" INDICATES "ON" CONDITION

| LINE ↓ | | | STATE → | 1 | 2 | 3 | 4 | 5 | 6 | 7 | 8 | 9 | 10 | 11 |
|---|---|---|---|---|---|---|---|---|---|---|---|---|---|---|
| I | | X | 1 | | X | | X | X | | X | | X | X | |
| | | X̄ | 2 | X | | X | | | X | | X | | | X |
| IN | M | | 1 | | | X | X | X | | | X | X | X | |
| IN | | | 2 | | X | | X | X | | X | | X | X | |
| OUT | | | 3 | | | | X | X | | | | X | X | |
| IN | Q | | 1 | X | | X | | | X | | X | | | X |
| IN | | | 2 | | X | X | X | | | X | X | X | | |
| OUT | | | 3 | | | X | | | | | X | | | |
| IN | P | | 1 | | X | | X | X | | X | | X | X | |
| IN | | | 2 | X | X | | | | X | X | | | | X |
| OUT | | | 3 | | X | | | | | X | | | | |
| IN | R | | 1 | | | | X | X | | X | | X | X | |
| IN | | | 2 | | | X | | | | | X | | | |
| YES | | | 3 | X | X | | | | X | | | | | X |
| NO | | | 4 | | | X | X | X | | | X | X | X | |
| IN | S | | 1 | | | X | | | | | X | | | |
| IN | | | 2 | | X | | | | | X | | | | |
| OUT | | a | 3 | | X | X | X | | | X | X | X | | |
| IN | N | | 1 | | X | | X | X | | X | | X | X | |
| IN | | | 2 | | | X | X | X | | | X | X | X | |
| IN | | | 3 | | X | X | X | | | X | X | X | | |
| NO | | | 4 | X | X | X | | X | X | X | X | | X | X |
| YES | | | 5 | | | | X | | | | | X | | |
| IN | U | | 1 | X | X | X | X | | | | | | X | X |
| IN | | | 2 | X | X | X | | X | X | X | X | | X | X |
| OUT | | | 3 | X | X | X | X | X | X | X | X | | X | X |
| IN | V | | 1 | | | | X | | | | | X | | |
| IN | | | 2 | | | | | X | X | X | X | X | | |
| OUT | | | 3 | | | | X | X | X | X | X | X | | |
| IN | W | | 1 | X | X | X | X | X | X | X | X | | X | X |
| IN | | | 2 | | | | X | X | X | X | X | X | | |
| NO | | b̄ | 3 | X | X | X | X | | | | | | X | X |
| YES | | b | 4 | | | | | X | X | X | X | X | | |
| 0 | | | 1 | | X | X | X | | | X | X | X | | |
| | | | 2 | | | | | X | X | X | X | X | | |

FIG. 8

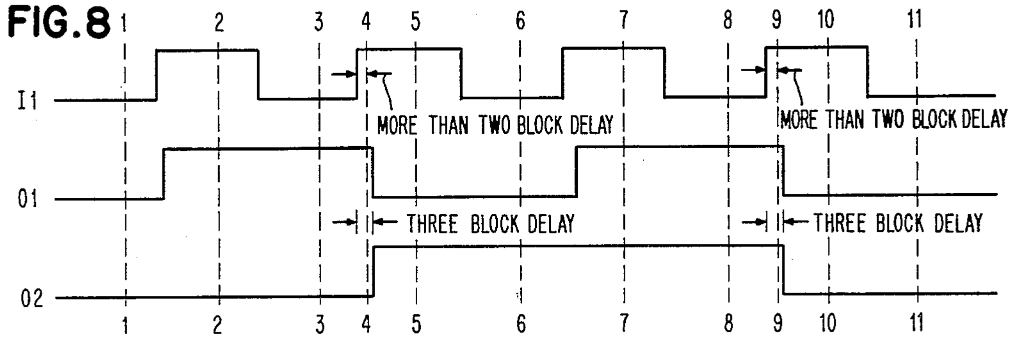

United States Patent Office 3,154,744
Patented Oct. 27, 1964

3,154,744
DOUBLE TRIGGER COMPOSED OF BINARY LOGIC ELEMENTS

Gerald A. Maley, Poughkeepsie, N.Y., assignor to International Business Machines Corporation, New York, N.Y., a corporation of New York Filed Dec. 9, 1959, Ser. No. 858,524
5 Claims. (Cl. 328—92)

This invention relates to electronic computers and more particularly to electronic counting circuits.

A double trigger is a simple type of electronic counter which usually consists of two flip-flops interconnected so that the output lines sequentially progress through the states "00," "01," "10" and "11" as the input line is repeated pulsed. As the circuit advances through each state in response to the input pulses, the states of the output indicate binary counts of "0," "1," "2," and "3," respectively.

In the usual type of double trigger the pulses to be counted are applied to the first flip-flop in such a manner that each pulse is effective to change the state of that flip-flop. The second flip-flop is so connected to the first flip-flop that whenever the first flip-flop is changed from a "1" representing state to a "0" representing state, the state of the second flip-flop is changed.

Since the first flip-flop changes state each time a pulse is applied to the input, the state of the first input indicates the lowest order binary digit. Likewise, the second flip-flop which changes state after each second input pulse indicates the second order binary digit.

Since the flip-flops change state sequentially the time delay between an input pulse and the change in both of the outputs is equal to the sum of the delays inherent in each of the flip-flop trigger stages.

Faster double triggers have been built by combining logical elements with two flip-flops. The logical elements are used to switch both flip-flops simultaneously, thereby providing a circuit wherein the delay between a change in the input and a change in the output is equal to the sum of the delay inherent in the logical elements which the triggers, plus the delay inherent in one flip-flop trigger.

The object of this invention is to provide a circuit which performs the function of a double trigger, but has a shorter time delay between the input signal and the output response.

A further object is to provide a circuit consistent with the above object, said circuit consisting solely of a combination of AND and OR logical blocks.

A further object is to provide a circuit which is consistent with the above objects and which has simultaneously changing outputs A further object is to provide a circuit consistent with the above objects utilizing a minimum number of logical blocks.

The foregoing and other objects, features and advantages of the invention will be apparent from the following more particular description of preferred embodiments of the invention, as illustrated in the accompanying drawings.

In the drawings:

FIG. 3 is a table showing the condition of various lines at various times during the cycle of operation of the circuit of FIG. 1.

FIG. 7 is a table showing the condition of various times during the operation of the circuit of FIG. 6.

FIG. 8 is a timing diagram for the circuit of FIG. 6.

Figure 1:
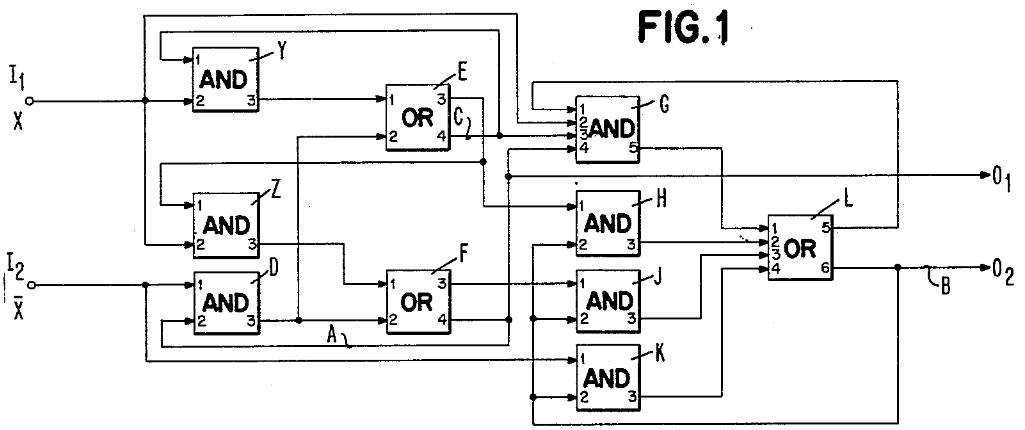
FIG. 1 is a schematic circuit diagram of a preferred embodiment of the invention.

The preferred embodiment of the invention shown in FIG. 1 comprises logical AND circuits Y, Z, D, G, H, J and K and logical OR circuits E, F and L. The AND and OR logical blocks shown may be of the well-known type described in Digital Computers, Components and Circuits, by R. K. Richards, pages 178 to 186, D. Van Nostrand Company, 1958. The inputs and outputs of the various logical blocks are designated by a letter, indicating the blocks, and a numeral to indicate the specific line. The lines entering the blocks on the left are inputs and the lines leaving the blocks on the right are outputs. Each OR circuit has two outputs which are complements of each other. The lower output line designates the output which is "on" when one or both of the input lines are "on" (an "or" output). The upper output line designates the output which is "on" when neither of the input lines in "on" (a "not or" output).

The inputs to the circuit, designated as I1 and I2, are complements of each other, and furthermore, there is no appreciable delay between the time when I1 changes states and the time when I2 changes state. The outputs from the circuit are designated as O1 and O2. The outputs indicate a "0" by an "off" condition and a "1" by an "on" condition. In reality the circuit responds to changes in the D.C. level of the inputs; however, for ease of explanation the "on" conditions of the input lines will be referred to as pulses.

As the input I1 is sequentially pulsed, output O1 which designates the first binary digit sequentially progresses through the states "0," "1," "0," "1" while output O2 which designates the second binary digit sequentially progresses through the states "0," "0," "1" and "1." Hence, as the I1 input is successively activated the O1 and O2 outputs sequentially progress through counts of "0," "1," "2" and "3" indicated by the binary outputs "00," "01," "10" and "11." (The right hand digit of each pair is the O1 output, the left hand digit of each pair is the O2 output.)

In general, the circuit consists of several interconnected latch circuits, each of which in turn comprises one or more AND circuits in combination with an OR circuit.

For instance, AND circuit Y in combination with OR circuit E forms one of the latch circuits. The "or" output E4 can be turned "on" by the input E2 (the initiate input). Thereafter, the "or" output E4 may be held "on" by the input Y2 (the hold input). However, the hold input Y2 would have no effect if the "or" output E4 had not already been turned "on" by the initiate input E2.

Each latch circuit has one or more hold inputs, an initiate input, an "or" output and a "not or" output. The "or" output may be turned "on" by the initiate input. Furthermore, once the "or" output has been turned "on" by the initiate input it may be held on by any of the hold inputs, but the hold inputs will not alone be effective to turn the "or" output "on." Any time the "or" ouput is "on" the "not or" output is not "on" and vice versa. Each latch circuit is considered active or "on" when the "or" output is "on."

The first latch circuit comprises AND circuit Y in combination with OR circuit E as described above.

The second latch circuit comprises AND circuit D in combination with OR circuit F. This second latch circuit also has an initiate AND block Z. That is, in order to initiate (i.e., turn "on") the latch circuit "or" output F4, the initiate AND block Z must be turned "on." The conditions neded to turn the initiate block Z "on" and hence, the conditions needed to initiate the second latch circuit output F4 are that the "not or" output of the first latch circuit E3 must be "on" and the first circuit input line I1–Z2 must be "on."

The third latch circuit comprises OR circuit L in combination with AND blocks H, J and K. Any one of the three hold inputs H1, J1, or K1 will hold the "or" output L6 "on." The third latch circuit also has an initiate AND block G which initiates (i.e., turns "on") the third latch circuit output L6, thereby rendering the hold circuits effective. The four inputs G1, G2, G3 and G4 are required to turn the initiate AND block G "on."

Figure 2:
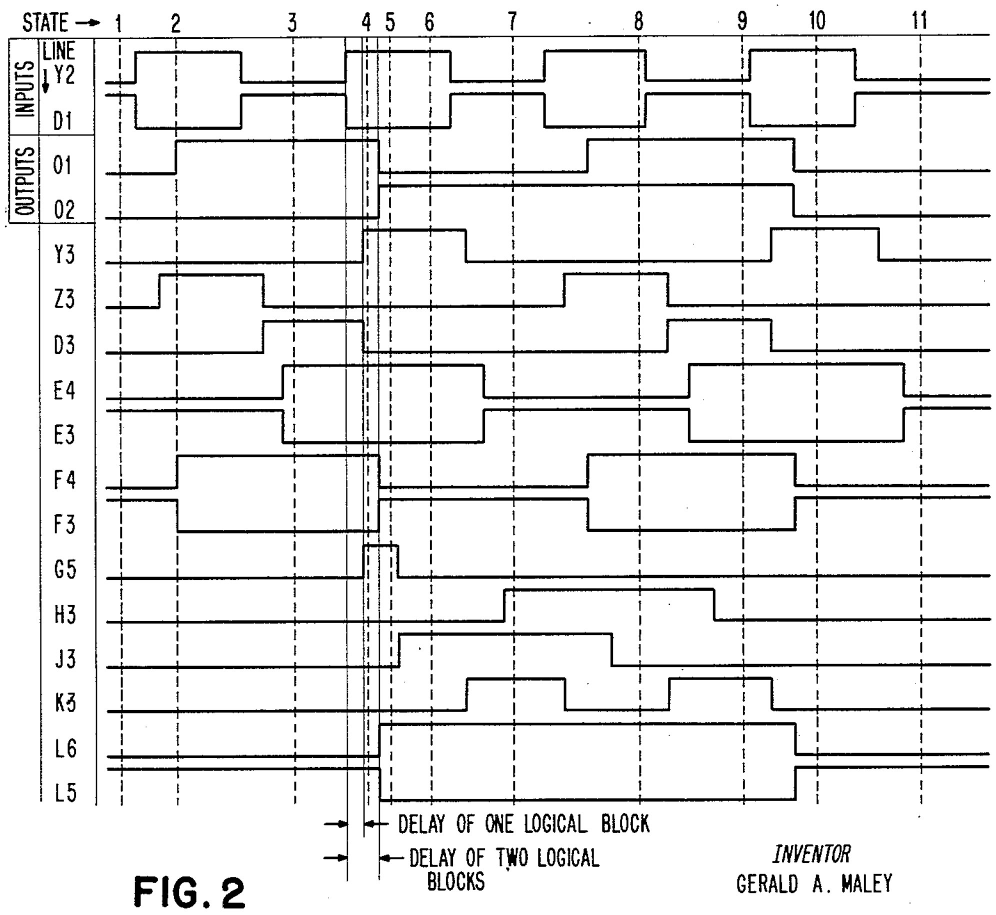
FIG. 2 is a timing diagram for the circuit of FIG. 1.

Operation of the circuit is most readily understood by sequentially examining each state through which the circuit passes. The condition of the inputs and outputs of the various elements during each state is shown in FIG. 2. Two of the states shown, 4 and 5, are not stable. That is, the outputs of all the logical blocks are not consistent with the inputs and hence the condition shown exists only for a time interval designated T, which is the time between when the input to any block changes and time when the output of that block has changed sufficiently to be an effective input to the next circuit block.

In the following description, the various lines will be designated by noting their beginning and terminal points. For example, the line between blocks Y and E will be designated as line Y3, E1.

The initial condition of the circuit with I2 "on" is designated state 1. This state is stable, and none of the logical blocks is in the "on" condition. However, line E3, Z1, which is the "not or" line of OR gate E is "on." Likewise, lines F3, J1 and L5, G1 are "on."

After the first pulse is applied to input I1, the AND circuit Z having inputs Z1 and Z2 produces an output Z3, F1 which in turn, turns OR circuit F "on" thereby producing outputs F4, O1 (state 2, see FIGS. 2 and 3). However, before O1 was turned "on" logical blocks Z and F had to sequentially change state, hence, we see that the output O1 appeared at a time 2T after the input I1 was applied. (Note T is the time required for one logical block to change state.)

After the first input pulse has ended (state 3) I1 is "off" and I2 is "on." Activation of I2, D1 in conjunction with F4, D2 (which remained "on" from the previous state) switches circuit D "on" thereby producing output D3, F2. The input D3, F2 now holds OR circuit F "on" maintaining output F4, O1 and line F4, D2 "on." Furthermore, line D3, E2 switches OR circuit E "on" thereby turning line E4, Y1 "on."

After the application of the second input pulse the circuit assumes a transitory state designated as state 4. When the input changes from I2 to I1, D1 is turned "off" and AND circuit D switches "off," switching D3, F2 "off." This occurs during the first time period T after the inputs I1 and I2 change. During this same period of time T, line I1, Y2 in conjunction with line E4, Y1 (which remained "on" from state 3) switches AND circuit Y "on," turning lines Y3, E1 "on." Furthermore, lines I1, G2 in conjunction with L5, G1; E4, G3; and F4, G4 (which were "on" from state 3) switch AND circuit G "on," thereby turning lines G5, L1 "on." Hence, at the time T after the application of the second input pulse (immediately after D, Y and G have changed state) the inputs to circuits F and L are not consistent with the output from these circuits, i.e., the circuits are in an unstable condition.

During the next time interval T these circuits, F and L will change state. After they change state the circuit assumes condition 5. The change in state of OR circuit F switches line F3, J1 "on" thereby providing an input to AND circuit J. The change of state of circuit L switches line L6, J2 "on," hence, at a time 2T after the application of the second input pulse to line I1, the inputs J1 and J2 of circuit J are "on" thereby making J unstable and conditioning it to change state during the next time interval T. Likewise, the change in state of L switches line L5, G1 "off" and hence at a time 2T after the application of the pulse to line I1, the circuit G is in an unstable condition. Note that the change in state of L and F switched output O1 "off" and output O2 "on." Hence, the delay between the change in the input and the change in the output was 2T, or twice the delay inherent in one logical block.

Condition 6 reflects the final stable condition of the circuit at a time more than 3T after the application of a pulse to input I1. The change in state of circuit J turns line J3, L3 "on" and the change in state of G turns line G5, L1 "off," hence, circuit J and line L6, O2 are maintained "on" even though the input to L switches from L1 to L3. Although the output appeared 2T after the inputs, the blocks G and J changed during the next time interval to stabilize the circuit.

At the end of the pulse on I1 the circuit switches to condition 7. Block Y switches "off" when I1, Y2 switches "off" turning Y3, E1 "off," thereby switching circuit E "off" and turning E3, H1 "on." L6, H2 in conjunction with E3, H1 switches block H "on" thereby turning line H3, L2 "on." Turning "on" line I2, K1 in conjunction with L6, K2 turns circuit K and line K3, L4 "on." However, the changes in state of blocks Y, E, H and K between states 6 and 7 in no way affect the outputs O1 or O2.

After the application of the third pulse to I1, the circuit assumes condition 8. Since E3, Z1 was "on" in condition 7, the application of a pulse to I1, Z2 switches circuit Z "on," thereby turning line Z3, F1 "on" and switching circuit F to the "on" state, thereby turning output line F4, O1 "on." The output L6, O2 is held "on" through circuit H which has inputs L6, H2 and E3, H1, both of which are "on." Circuits Z and F had to sequentially change state before O1 changed state, hence, the output O1 changed state 2T after the application of the input pulse to I1.

At the end of the third pulse on line I1 the circuit assumes condition 9. Turning the line I2, D1 "on" in conjunction with line F4, D2 which was already "on" from state 8 turns circuit D "on" thereby turning line D3, F2 "on" and holding circuit F "on" even though line Z3, F1 which held circuit F "on" in condition 8 is turned "off." Turning line I1 "off" at the end of the third pulse switched I1, Z2 "off" thereby switching Z "off" and turning Z3, F1 "off." Turning line D3, E2 "on" switches block E "on," thereby turning line E3, H1 "off" and switching block H "off." Turning I2, K1 "on" switches block K "on." Block K holds block L "on" through line K3, L4.

Upon application of the fourth pulse the circuit assumes condition 10. Switching I2, D1 "off" switches circuit D "off," thereby switching line D3, F2 "off." After line D3, F2 switches "off," the circuit F no longer has any inputs and therefore switches "off," thereby turning F4, O1 "off." Turning line I2, K1 "off" switches circuit K "off" turning K3, L4 "off" and thereby switching circuit L "off" and turning line L6, Q2 "off." Note that before output O1 changed state, blocks D and F sequentially changed state requiring a time 2T, and likewise before O2 changed state, blocks K and L sequentially changed state requiring the same time interval 2T.

Finally after the end of the fourth pulse the circuit assumes condition 11 which is the same as condition 1. Turning line I1, Y2 "off" switches circuit Y "off" and turns line Y3, E1 "off" thereby switching circuit E "off." The application of a fifth pulse would cause the circuit to commence recycling.

By way of mathematical expression in Boolean algebra the circuit may be described by the following expressions:

$$A=\bar{x}a+\bar{c}x$$

$$B=x\bar{b}ca+\bar{c}b+\bar{a}b+\bar{x}b$$

$$C=\bar{x}a+xc$$

wherein:

$$x=I1=Y2$$
$$\bar{x}=I2=D1$$
$$a=D2$$
$$\bar{a}=J1$$
$$b=K2$$
$$\bar{b}=G1$$
$$c=Y1$$
$$\bar{c}=Z1$$
$$A=F4$$
$$B=L6$$
$$C=E4$$

In the expression given above it must be recognized that the output signals designated by capital letters are in part dependent upon the same signals used as inputs. Above, the inputs are designated by small letters to show a distinction; however, it can be seen by reference to FIGURE 1 that structurally they are the same lines.

Various other embodiments of the invention can be obtained by manipulating the circuit equations with the use of the well-known Karnaugh map technique (see "The Map Method for Synthesis of Combination Logic circuits," A.I.E.E. trans, part I, Communications and Electronics, volume 72, November 1953, pp. 593–599).

In the Karnaugh plot as shown (FIGS. 4 and 5) each variable is represented by some area in the plot. For instance, the upper eight squares represent the variable "$a$" while the lower eight squares represent the variable "not $a$." Likewise, the four squares on the right hand side and the four squares on the left hand side represent the variable "not $b$" while the eight center squares represent the variable "$b$." The area associated with each variable is designated on the periphery of the figures.

A Boolean function is plotted by designating the area represented by each term in the expression (as with the crosshatching). If the terms are connected by an OR conjunctive the function is represented by the sum of the areas designated by the terms, and if the terms of the function are connected by an AND conjunctive the function is represented by the coincident areas.

Any functions which can be represented by the same areas are equivalent, since when reduced to their simplest form, they will each contain the same terms (i.e., the terms which designate the areas which the functions occupy).

Figure 4:
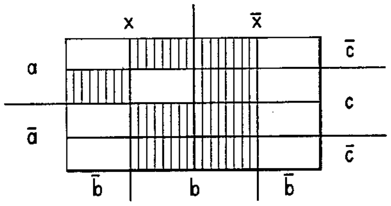
FIG. 4 is a Karnaugh plot of the Boolean expression which descibes the first embodiment.
Figure 5:
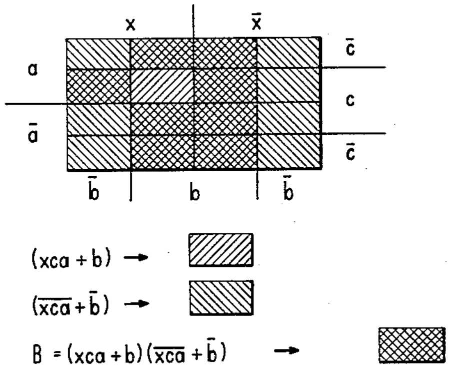
FIG. 5 is a Karnaugh plot of the Boolean expression which describes a second embodiment.
Figure 6:
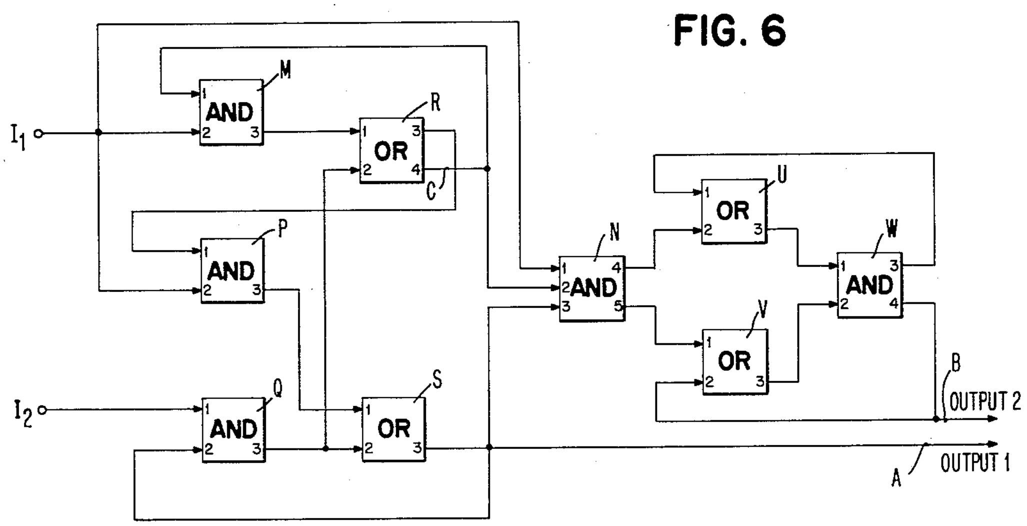
FIG. 6 is a schematic circuit diagram of the second embodiment of the invention.

As an example the Karnaugh plot of the equation $B=x\bar{b}ca+\bar{c}b+\bar{a}b+b\bar{x}$ is shown in FIG. 4. It can be seen from FIG. 5 that the equation $B=(xca+b)(\overline{xca}+\bar{b})$ describes the same area of the plot and hence is equivalent. The resultant circuit is shown in FIG. 6.

The second embodiment of the invention is described by the following Boolean equations:

$$A=\bar{x}a+x\bar{c}$$
$$C=\bar{x}a+xc$$
$$B=(xca+b)(\overline{xca}+\bar{b})$$

wherein:

$$a=s3$$
$$b=W4$$
$$\bar{b}=W3$$
$$c=R4$$
$$\bar{c}=R3$$
$$x=I1=M2$$
$$\bar{x}=I2=C1$$

The various states through which the circuit passes are outlined in FIG. 7. The states shown occur at the times indicated in FIG. 8. The N and W AND blocks have complementary outputs. N5 and W4 are "and" outputs which are active when all of the inputs to the respective blocks are active, and N4 and W3 are "not and" outputs which are complements of the "and" outputs.

In this second embodiment it is noted that the delay between the second pulse and the output response thereto is equal to 3T. Likewise, the delay between the third pulse and the output response thereto is 3T. However, only nine logical blocks are used instead of ten as used in the first embodiment.

In certain computer applications a counter which operates in the reverse order is necessary. That is, instead of counting 0, 1, 2, 3, it is necessary to count 3, 2, 1, 0. Since in the binary system a forward count is represented by: 00, 01, 10, 11; and a reverse count is represented by: 11, 10, 01, 00, it is apparent that to construct a reverse counter it is only necessary to take outputs which are the complements of the outputs in the forward counter. In the circuit shown in the first embodiment, the first digit output would be taken from F3 instead of F4 and the second digit output is taken from O5 instead of O6.

While the invention has been particularly shown and described with reference to preferred embodiments thereof, it will be understood by those skilled in the art that the foregoing and other changes in form and details may be made therein without departing from the spirit and scope of the invention.

I claim:

1. An electronic counter for producing binary coded count representing signals corresponding to the number of previously applied count pulses, said counter comprising, two input lines designated $x$ and $\bar{x}$, signals on said lines providing complementary inputs, an intermediate line $c$, two output lines designated as $a$ and $b$, signals on line $a$ representing the first binary digit and signals on line $b$ representing the second binary digit, and a plurality of AND and OR circuits, said input lines, said AND and OR circuits and said ouput lines being interconnected in accordance with the following Boolean equations:

$$a=\bar{x}a+x\bar{c}$$
$$b=x\bar{b}ca+\bar{c}b+\bar{a}b+\bar{x}b$$
$$c=\bar{x}a+xc$$

2. In a circuit for producing a binary count of the voltage pulses supplied thereto by a first circuit input line, complementary voltage pulses being supplied thereto on a second circuit input line, the combination of: a first latch circuit, said first latch circuit having initiating means for activating said first latch circuit, means responsive to voltage pulses on said first circuit input line to hold said first latch circuit active, an "or" voltage output, and a "not or" voltage output; a second latch circuit having second latch circuit initiating means responsive to the coincidence of voltage signals from said first circuit input line and said first latch circuit "not or" output for activating said second latch circuit, second latch circuit holding means responsive to voltage pulses on said second circuit input line for holding said second latch circuit active, an "or" voltage output and a "not or" voltage output; means responsive to the coincidence of voltage pulses on said second latch circuit "or" output and on said second circuit input line, for initiating said first latch circuit; whereby said second latch circuit "or" output is rendered active for alternate pulses on said first circuit input line, said second latch circuit "or" output thereby representing the first digit of a binary count of the pulses applied to said first circuit input line, a third latch circuit having "or" and "not or" voltage outputs, initiating means responsive to the coincidence of voltage signals from said third latch circuit "not or" output, said first circuit input line, said first latch circuit "or" output, and said second latch circuit "or" output for activating said second latch circuit; holding means for holding said third latch circuit active, said holding means responsive to said first latch circuit "not or" output, said second latch circuit "not or" output, and said second circuit input line, whereby said third latch circuit "or" output is rendered active by the second pulse of a sequence of four pulses on said first circuit input line and deactivated by the fourth pulse of a sequence of four pulses on said first circuit input line, thereby representing the second digit of a binary count of the pulses applied to said first circuit input line.

3. In a circuit for producing a binary count of the voltage pulses supplied thereto by a first circuit input line, complementary voltage pulses being supplied thereto on a second circuit input line, the combination of first, second, third, fourth, fifth, sixth, and seventh AND circuits, each of said circuits having a plurality of inputs, and an output which is activated when all of the inputs are activated; first, second, and third OR circuits, each of said OR circuits having a plurality of inputs, an "or" and a "not or" output said "or" output being activated when any one of the inputs is active and said "not or" output being activated when none of the inputs is active; means connecting the "or" output of said first OR circuit to an input of said first AND circuit, means connecting the first circuit input line to an input of the first AND circuit, means connecting the "not or" output of the first OR circuit to an input of the second AND circuit, means connecting the first circuit input line to the input of the second AND circuit, means connecting the second circuit input line to an input of the third AND circuit, means connecting the "or" output of the second OR circuit to an input of the third AND circuit, means connecting the output of the first AND circuit to an input of the first OR circuit, means connecting the output of the third AND circuit to inputs of the first and second OR circuits, means connecting the output of the second AND circuit to an input of the second OR circuit, a first circuit output line, means connecting the "or" output of the second OR circuit to the first circuit output line, whereby said first circuit output line is activated for alternate pulses on said first circuit input line to indicate the first digit of a binary count of the pulses supplied to said first circuit input line, means connecting the "not or" output of the third OR circuit to an input of the fourth AND circuit, means connecting the first circuit, input line to an input of the fourth AND circuit, means connecting the "or" output of the first OR circuit to an input of the fourth AND circuit, means connecting the "or" output of the second OR circuit to an input of the fourth AND circuit, means connecting the "not or" output of the first OR circuit to an input of the fifth AND circuit, means connecting the "not or" output of the second OR circuit to an input of the sixth AND circuit, means connecting "or" output of the third OR circuit to an input of the fifth, sixth and seventh AND circuits, means connecting the second input line to an input of the seventh AND circuit, means connecting the output of the fourth AND circuit to an input of the third OR circuit, means connecting the output of the fifth AND circuit to an input of the third OR circuit, means connecting the output of the sixth AND circuit to an input of the third OR circuit, means connecting the output of the seventh AND circuit to an input of the third OR circuit, a second circuit output line, and means connecting the "or" output of the third OR circuit to the second circuit output line, whereby said second circuit output line is activated to indicate the second digit of a binary count of the voltage pulses supplied to said first circuit input line.

4. In a circuit for counting electrical voltage pulses, said pulses being supplied to a first circuit input line and pulses which are the complement thereof being supplied by a second circuit input line; first, second, third, fourth and fifth AND circuits, said first, second and third AND circuits having a plurality of inputs and an "and" output, said fourth and fifth AND circuits having a plurality of inputs, an "and" and a "not and" output, a first, a second, a third and a fourth OR circuit, all of said OR circuits having an "or" output, said first OR circuit having a "not or" output, means connecting said first circuit input line to the inputs of said first and second AND circuits, means connecting said second circuit input line to an input of said third AND circuit, means connecting the output of said first AND circuit to an input of said first OR circuit; means connecting the output of said third AND circuit to the inputs of said first and second OR circuits; means connecting the output of said second AND circuit to an input of said second OR circuit, means connecting the "or" output of said first OR circuit to an input of said first AND circuit, means connecting the "not or" output of said first OR circuit to an input of said second AND circuit, means connecting the "or" output of said second OR circuit to an input of said third AND circuit, a first circuit output line, means connecting the output of said second OR circuit to said first circuit output line, whereby said first circuit output line is activated by alternate pulses on said first circuit input line to indicate the first digit of a binary count of said pulses, means connecting the output of said second OR circuit to an input of said fourth AND circuit, means connecting said first circuit input line to an input of said fourth AND circuit, means connecting the "or" output of said first OR circuit to an input of said fourth AND circuit, means connecting the "not or" output of said fourth AND circuit to an input of said third OR circuit, means connecting the "and" output of said fourth AND circuit to an input of said fourth OR circuit, means connecting the output of said third OR circuit to an input of said fifth AND circuit, means connecting the output of said fourth OR circuit to an input of said fifth AND circuit, means connecting the "not and" output of said fifth AND circuit to an input of said third OR circuit, a second circuit output line, means connecting the "and" output of said fifth AND circuit to the input of said fourth OR circuit and to said second circuit output line, whereby said second circuit output line is activated to represent the second digit of a binary count of the voltage pulses supplied to said first circuit input line.

5. An electronic counter for producing binary coded count representing signals corresponding to the number of previous applied count pulses, said counter comprising, two input lines designated $x$ and $\bar{x}$, signals on said lines providing complementary inputs, an intermediate line $c$, two output lines designated as $a$ and $b$, signals on line $a$ representing the first binary digit and signals on line $b$ representing the second binary digit, and a plurality of AND and OR circuits, said input lines, said AND and OR circuits and said output lines being interconnected in accordance with the following Boolean equations:

$$a = \bar{x}a + x\bar{c}$$
$$c = \bar{x}a + xc$$
$$b = (xca + b)(\overline{xca} + \bar{b})$$

References Cited in the file of this patent

UNITED STATES PATENTS 2,875,432 Markow ---------------- Feb. 24, 1959

OTHER REFERENCES

Richards: "Digital Computer Components and Circuits," Van Nostrand Co., Princeton, New Jersey, 1957.

Richards: "Arithmetic Operations in Digital Computers," Van Nostrand Co., Princeton, New Jersey, 1955.